(12) United States Patent
Delmoro et al.

(10) Patent No.: US 6,431,963 B1
(45) Date of Patent: Aug. 13, 2002

(54) TIRE UNIFORMITY MACHINE GRINDER

(76) Inventors: Richard L. Delmoro, 344 Southeast Ave., Tallmadge, OH (US) 44278; Dave Krause, 11916 Geib Ave., Hartville, OH (US) 44632; David Poling, Sr., 2740 Cory Ave., Akron, OH (US) 44314

( * ) Notice: Subject to any disclaimer, the term of this patent is extended or adjusted under 35 U.S.C. 154(b) by 0 days.

(21) Appl. No.: 09/678,241

(22) Filed: Oct. 4, 2000

(51) Int. Cl.$^7$ ................................................ B24B 5/00
(52) U.S. Cl. ........................... 451/49; 451/65; 451/456; 241/DIG. 31
(58) Field of Search ..................... 451/49, 65, 67, 451/57, 246, 254, 258, 456; 241/DIG. 31

(56) References Cited

U.S. PATENT DOCUMENTS

| | | | |
|---|---|---|---|
| 3,905,160 A | * | 9/1975 | McKenney .................. 51/106 |
| 4,041,647 A | * | 8/1977 | Ugo .......................... 51/106 R |
| 4,071,979 A | * | 2/1978 | Ugo .............................. 51/106 |
| 4,736,546 A | | 4/1988 | Ugo .......................... 51/106 A |
| 5,099,613 A | * | 3/1992 | Rogers, Jr. ................. 51/165 R |
| 5,167,215 A | * | 12/1992 | Harding, Jr. ................... 51/273 |

\* cited by examiner

Primary Examiner—Joseph J. Hail, III
Assistant Examiner—Anthony Ojini
(74) Attorney, Agent, or Firm—Reese Taylor

(57) ABSTRACT

A grinder in a tire uniformity machine that receives a tire for testing, the grinder including an arm received in bearings; a grinding head supported on the arm, the grinding head having a rotatable grinding stone and a motor causing the rotation of the grinding stone; and a linear actuator operatively engaging the arm to selectively cause axial movement thereof causing the grindstone to selectively contact the tire.

10 Claims, 3 Drawing Sheets

TIRE UNIFORMITY MACHINE GRINDER

RELATED PATENT APPLICATIONS

Patent application Ser. No. 09/678,242, filed Oct. 4, 2000, entitled Dual Grindstone.

FIELD OF THE INVENTION

The present invention generally relates to tire uniformity machines. The present invention more particularly relates to a grinding apparatus in a tire uniformity machine. Most particularly, the present invention relates to a linearly actuated grinding apparatus used for removing material from tires in a tire uniformity machine.

BACKGROUND OF THE INVENTION

In tire uniformity machines, a tire is tested by rotating it at various speeds to ensure that the tire has been constructed and performs within quality standards. During this testing process, the tire is rotated and the tire uniformity machine examines the tire's shape and surface characteristics to a high degree of accuracy. At times, during this examination, the tire uniformity machine detects irregularities in the tire. Any irregularity in the surface and shape of the tire may be corrected by removing material from appropriate portions of the tire.

To remove material, known tire uniformity machines typically employ a grinder having a single cylindrical grindstone rotating in relations to the rotation of the tire. As the tire rotates, the grindstone is selectively brought into contact with the tire to remove material.

In known grinders, the application of the grindstone occurs in a rotary fashion. The typical grinder has a pivoting arm on which the grindstone and its motor are mounted. Often a motor and gear box arrangement is used to control the speed and direction of rotation of the grindstone. The motor is then connected to the grindstone by belts or chains and a series of pulleys or sprockets. As will be appreciated, the motor and gear box are bulky and the positioning of this unit is limited. In fact, the typical motor housing projects to such an extent that the confines of the tire uniformity machine prevent the grindstone from being actuated in a linear fashion.

To overcome this, known tire uniformity machines attach the motor distally from the grinder on an arm that houses the drive belt or chain. In this way, the motor is located away from the instrumentation, the load wheel, and other devices that must be placed proximate to the test tire, where there is more space. The arm is mounted on a pivot such that the motor housing moves radially in a limited area. The pivot is located between the motor and grindstone, and the arm rotates under the force of a hydraulic cylinder attached to the arm on one side of the pivot. The typical hydraulic cylinder acts transversely of the arm and thus is mounted on a separate frame member than the frame member on which the arm pivots. So mounted, the hydraulic cylinders reduce visibility and access to the grinder and the area surrounding the grinder.

Due to the rotation of the arm, the grinder may not be aimed directly at the tire center. In other words, the center line and the contact point of the grinder travel in an arc in an attempt to tangentially contact the tire. As will be readily understood, initiating contact with the tire in this manner makes it difficult to make good, accurate contact in a repeatable manner. Further, the housing of the grinder must be adjusted to clear the machine housing and attempt to make proper contact between the grinder and the tire. Specifically, the grinder housing often is connected to a vacuum supply to remove particles created by the grinding process, and this housing must be made to closely fit the grindstone. Since this housing closely fits about the grindstone, in these devices, simple rotation of the arm may cause the housing to contact the rotating tire. As will be appreciated, such contact could significantly damage the grinding apparatus and may cause damage to the tire.

To avoid such contact and to better position the grindstone to remove material, known devices adjust the position of the housing and grindstone by rotating the housing relative to the arm. To make this adjustment, known devices incorporate a series of linkages. In some cases, as many as five linkages may be used. Due to machining tolerances, each link is a source of error. When multiple links are used, this error is compounded making it more significant in terms of accurate removal of the tire material. These errors make it difficult to achieve good contact with the tire.

SUMMARY OF THE INVENTION

In light of the current status of the art, it is an object of the present invention to provide a grinder that reduces the error associated with the use of multiple linkages.

It is a further object of the present invention to linearly actuate the grinder into contact with the tire.

In view of at least one of these objects, the present invention provides a grinder in a tire uniformity machine that receives a tire for testing, the grinder including an arm received in bearings; a grinding head supported on the arm, the grinding head having a rotatably grinding stone and a motor causing the rotation of the grinding stone; and a linear actuator operatively engaging the arm to selectively cause axial movement thereof causing the grindstone to selectively contact the tire.

The present invention further provides a grinder in a tire uniformity machine receiving a tire having a central axis for testing, the grinder including a support member; linear bearings mounted on the support members; an arm carried on the bearings and moveable toward or away from the tire; a grinding head supported on an end of the arm proximate the tire, the grinding head having a pair of rotatable grindstones adapted to contact the tire and at least one motor causing the rotation of the grindstones; and a linear actuator operatively engaging the arm causing the grindstone to move linearly to contact the tire.

The present invention further provides a method of removing material from a tire in a tire uniformity machine that rotates a tire for testing, the method including providing an arm; carrying a rotatable grindstone on an end of the arm; supporting the arm on linear bearings; driving the arm linearly toward the tire causing the grindstones to contact the tire; and rotating the grindstone as the grindstone contacts the tire.

The present invention further provides a grinding head in a grinder for a tire uniformity machine having a frame, the tire uniformity machine receiving a tire for testing within the frame, the grinding head including a grindstone rotatably supported in a shroud and directly driven by a motor mounted adjacent to the grindstone.

It accordingly becomes a principal object of this invention to provide a tire uniformity machine grinder of the character above-described with other objects thereof becoming more apparent upon a reading of the following brief specification considered and interpreted in view of the accompanying drawings.

DETAILED DESCRIPTION

A grinder according to the present invention is generally referred to by the numeral 10 in the accompanying drawing figures. Grinder 10 is used to remove material from a tire T. Tire T is located in a tire uniformity apparatus and accordingly is rotatably mounted within the tire uniformity machine. During operation of the tire uniformity machine, tire T may be caused to rotate, by an appropriate drive mechanism, such that the tire T rotates about a central axis CA. The tire uniformity machine causes the tire T to rotate to evaluate aspects of the tire T including its surface characteristics.

To that end, a load wheel, which is moved into and out of contact with the rotating tire, and various sensors may be employed to obtain information about the tire's integrity, shape, and surface qualities. Irregularities in the surface S of tire T may be corrected by appropriate removal of material from the surface S. To remove material, grinder 10 is selectively brought into contact with the surface S of tire T.

Figure 1:
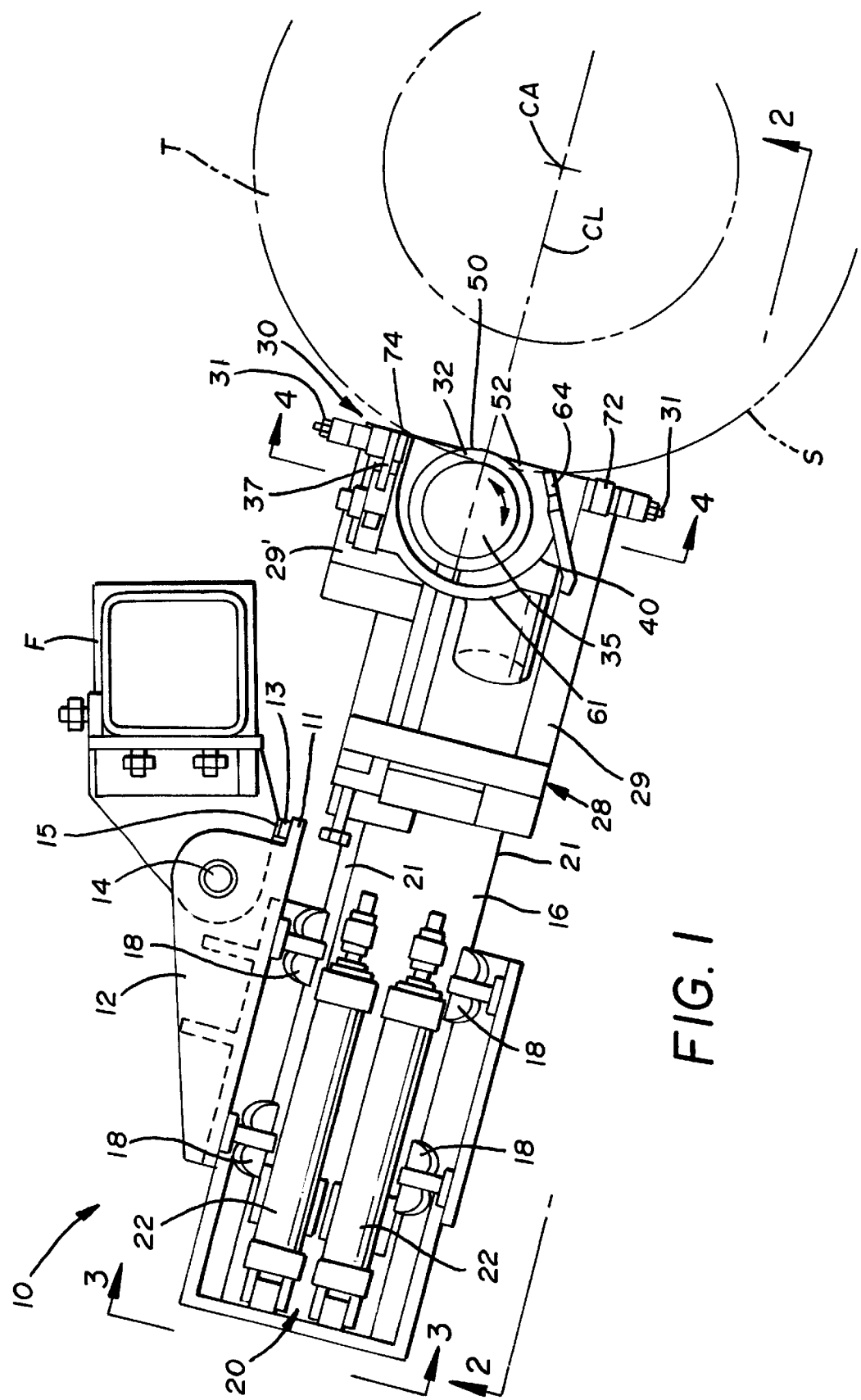
FIG. 1 is a top plan view of a grinder in a tire uniformity machine according to the present invention.
Figure 2:
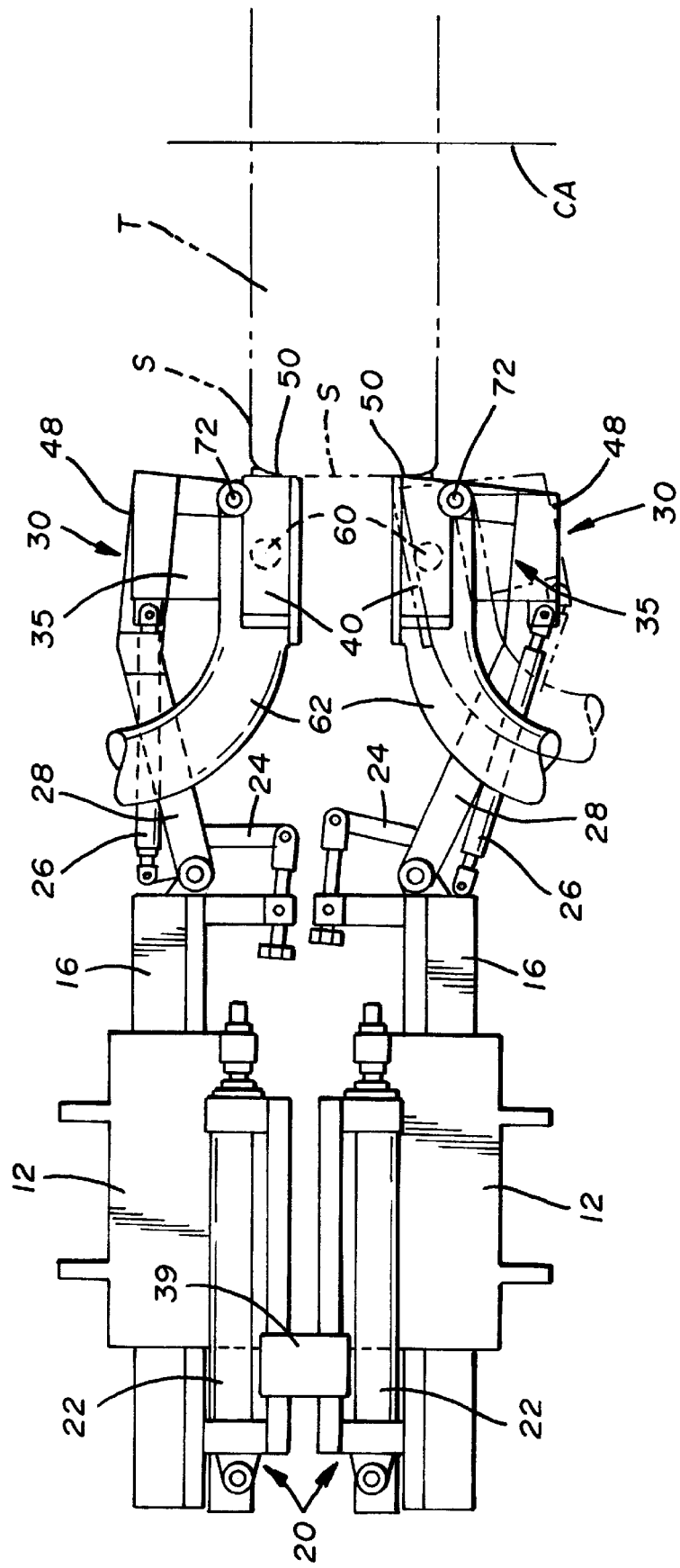
FIG. 2 is a side elevational view thereof.

Grinder 10 is suitably supported proximate to tire T to affect such contact, for example, by a frame F. Frame F may be an independent support or a part of the tire uniformity machine, as shown. Grinder 10 generally includes a support member 12 attached to frame F. As shown in FIG. 1, support member 12 may be provided with a pivot 14 to allow for radial adjustment of support member 12 relative to the frame F. Pivoting of the support member 12 allows the grinder 10 to be aligned with the tire to ensure proper contact between the grinder 10 and tire T. The center line CL of grinder 10 may be aligned with the central axis CA of tire T to achieve simultaneous contact of the grindstones of grinder 10.

Once aligned, the grinder 10 may be positively locked into place such that it remains aligned during the grinding process. To that end, support member 12 may be provided with a pivot stop 11 extending from support 12. Further, a bumper 13 and shim 15 may be provided between the frame and support member 12 to adjust spacing. It will be appreciated that, shim 15 and bumper 13 may be located between the frame F and pivot stop 11. Thus, the radial position of support member 12 may be adjusted by varying the size of the shim 15 and then the grinder 10 may be locked against Frame F. Alternatively, a dynamic adjustment system may be used incorporating appropriate sensors for determining the position of the grinder 10 relative to the tire T and its center line CL and an appropriate actuator, responsive to the sensors, for changing the radial position of the grinder 10 by movement of support member 12 relative to the frame F. In this way, the grinder 10 may be appropriately aligned with respect to the tire T. Preferably, the center line CL of grinder 10 will be aligned with the axis CA of the tire T.

Figure 3:
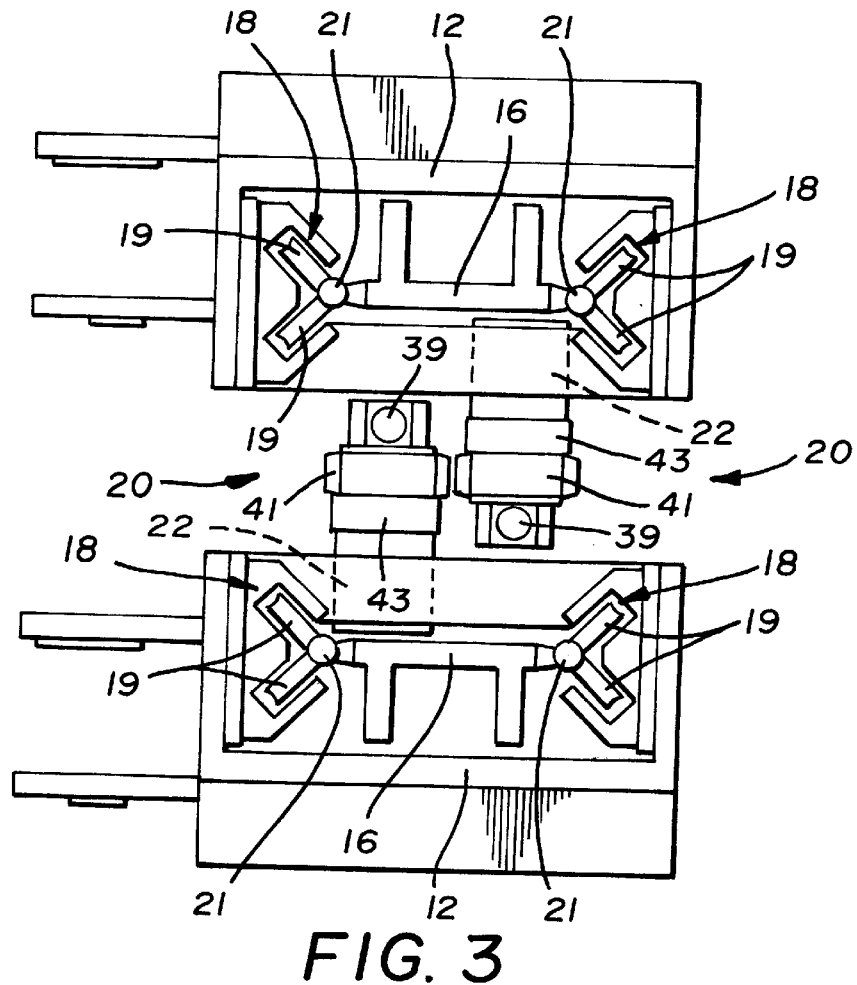
FIG. 3 is a front elevational view thereof.
Figure 4:
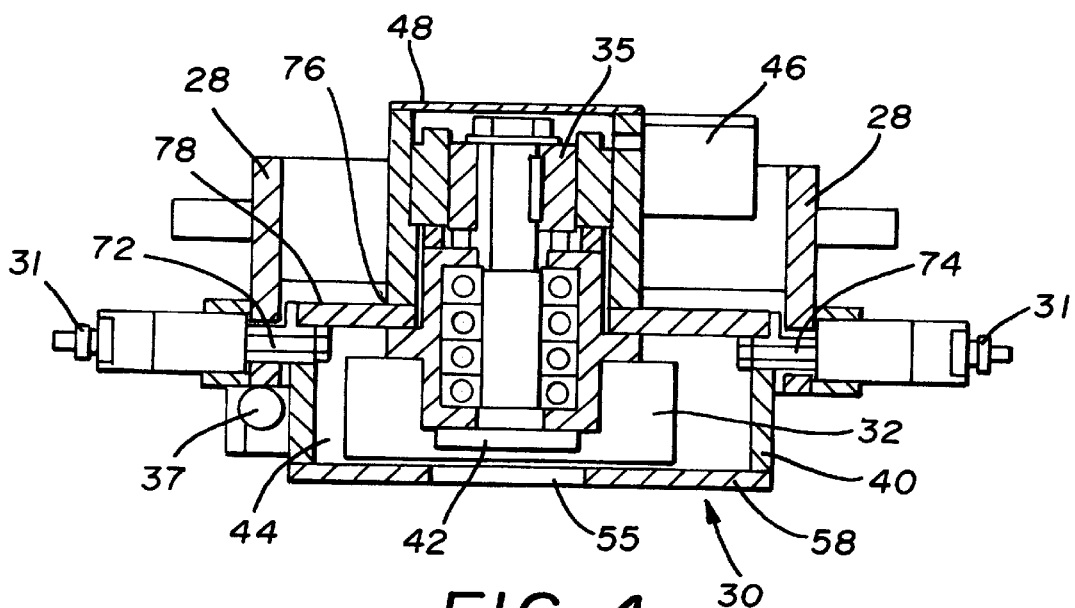
FIG. 4 is a fragmented sectional view of the grinding head and motor as might be seen along line 4—4 in FIG. 1.

One or more arms 16 are held in spaced relation by support member 12. Arms 16 are supported on bearings 18 that facilitate substantially linear movement of the arms 16 toward and away from the tire T. Bearings 18, as shown in FIG. 3, are linear bearings and may include rollers 19 suitably mounted on support member 12. Rollers 19 are vertically aligned to receive edges 21 of arms 16. Offset bearings 18, such as those shown in FIG. 3, may be employed and located at either side of the edges 21 of arm 16 to help resist forces acting on the arm 16 and maintain the position of the arm 16. Referring to FIGS. 4 and 5, bearings 18 may be located in fore and aft positions on the support member, and longitudinally aligned to guide the arm 16 upon actuation.

The arms 16 are actuated by a suitable linear actuator generally referred to by the numeral 20, including fluid driven actuators, such as, hydraulic or pneumatic cylinders, motor driven actuators, electric actuators and the like. In the embodiment shown, actuator 20 includes a pair of cylinders 22 that expand to drive the arms 16 toward tire T and retract to pull the arms 16 away from the tire T.

As previously discussed, the manipulation of grinder 10 may be controlled by various methods available in the art. For example, hydraulic or pneumatic cylinders 22 may be employed to extend and retract the arm 16 carrying grinding heads 30. In such a case, supply lines (not shown) carrying fluid from a fluid supply may be used to selectively direct fluids to the cylinders 22 and to apply a motive force. The activation of these cylinders 22 may be coordinated by sensor 37 located in sensing relation to tire T or grinding head 30. The sensor 37 being in communication with a controller 39 that controls the fluid supply to the cylinders 22. In the embodiment shown, a servo valve 41 is used to control the flow of fluid passing through a manifold 43 that supplies the cylinders 22. As a result of the flow control, position of the grinding head 30 relative to the tire T is controlled.

Additionally, the position of grinding heads 30 relative to each other and tire T may be adjusted as required by the particular tire T. To that end, arms 16 are provided with a separation adjuster 24 and a tilt adjuster 26 engaging ends 28 of arms 16. The ends 28 may be made pivotable to allow spacing of grinding heads 30 relative to each other or arms 16. To provide further manipulation of grinding head 30, grinding head 30 may be pivotally attached to ends 28 of arms 16. As best shown in FIG. 7, grinding head 30 may be pivotally mounted between spaced members 29 of ends 28 and rotate or tilt therebetween. While the grinder 10 may be oriented in any position and the tilting may be varied accordingly, the grindstone 32 substantially lies in a plane parallel to the plane of the tire T. When the grindstone 32 is tilted, the grindstone 32 deviates from this plane and generally rotates between a plane substantially parallel to that of the tire T to a plane substantially perpendicular to that of the tire T. As can be appreciated, the amount of tilt may be limited by appropriate stops or limiters, and the tilt adjuster 26 may control the amount and rate of tilt. Tilt adjuster 26 extends from arm 16 or end 28 to grinding head 30 to control the amount of tilt of grinding head 30. To limit the range of motion of grinding head 30, an adjustable pivot lock 31 may engage grinding head 30. In this way, the adjustment members 24, 26 may be used to alter the spacing of grinding head 30, or to tilt the grinding heads 30 relative to the tire T and arms 16. Various adjustment members 24, 26 may be used including mechanical actuators such as threaded members, gears, ratchet members, fluid cylinders, or cams; or electric actuators including linear rails. Alternatively, spacing and tilt may be adjusted by moving the grinding heads 30 on the frame F, or support member 12.

Grinding heads 30 are supported on ends 28 of arms 16 and generally include a grindstone 32 driven by at least one motor 35. Further, the motor 35 is supported adjacent to a shroud 40 and may be mounted to the ends 28 of arms 16 or to the shroud 40 itself. The grindstone 32 is operatively attached to the motor 35 and may be driven directly thereby. By directly driving the grindstone and eliminating the belts and pulleys used in known systems, the size of the motor may be reduced. The elimination of the belt or chain system and the reduced size of the motor 35 results in reduced inertia of motor 35. This reduced inertia allows the motor 35 to quickly reverse directions, when a reversible motor 35 is used. In the embodiment shown, a reversible motor 35 is used to directly drive the grindstone 32. By reversing the grindstone 32 quickly the directly drive motor 35 may significantly reduce processing time, when reversal is necessary.

As best shown in FIG. 7, the motor 35 may be secured adjacent to the shroud 40. The shaft 42 of motor 35 extends through an opening formed within the shroud and extends into the grinding chamber 44, defined by the shroud 40, where it is coupled to the grindstone 32. Power to the motor 35 is supplied conventionally by cables, which may connect to the motor 35 at a junction box 46. To protect the components of motor 35, a housing 48 is provided to substantially cover the exposed surfaces of motor 35.

To help contain and remove these particles, the shroud 40 closely fits over grindstone 32. The shroud 40 may generally define an opening 50 located radially outwardly from the axis of rotation of grindstone 32 and spaced therefrom such that the grinding surface 52 of grindstone 32 is exposed. Further, shroud 40 may define an opening 55 axially spaced from the grindstones 32 to allow access to the interior of shroud 40 for purposes of cleaning or to repair or replace the grindstone 32. During operation, the axially spaced opening 55 may be closed by a suitable cover 58.

The shroud 40 may be provided with a nozzle 60 attached to a vacuum source for the removal of particulate created during the grinding process. When the shroud 40 has a curved wall 61, as shown in FIG. 1, the nozzle 60. may open into chamber 44 tangentially, as best shown in FIG. 3. A nozzle 60 may be fluidly connected to the vacuum source by a hose 62. To further aid in the removal of particulate, a jet nozzle 64 may direct a supply of fluid toward the tire T to attempt to expel particulate lodged within the treads of tire T or on the surface S thereof. Jet 64 is fluidly connected to a supply distal from the grindstone 32. Jet 64 may be located outside of or within shroud 40. Preferably, jet 64 is located near the tire T and may be positioned such that it is centrally located within the vacuum stream created by the vacuum source, as discussed in copending application referred to above.

The shroud 40 is open toward the tire T exposing a portion of the grindstone 32 to the tire T. The sensor 37 may be mounted on the shroud 40 or proximate thereto to determine the amount of material removed from the tire T. Sensor 37 communicates with controller 39 which accordingly controls the movement of grindstone 32.

When removing material from the tire T, contact is made by grindstone 32. Depending on the particular tire T and desired grinding effect, the rotation of grindstone 32 may be changed relative to the direction of rotation of tire T.

As previously discussed, the position of the arms 16 and thus the grinding heads 30 may be controlled by selectively extending or retracting the arms 16 by way of the linear actuator 20. Extension of the arms 16 drives the grinding head 30 in a substantially straight line to place grindstone 32 of the grinding head 30 into contact with surface S of tire T. In this way, the grinding head 30 is directly driven by a single actuator 20 into contact with the tire T. Once sufficient material is removed from the tire T, the linear actuator 20 retracts the arm 16 pulling the grindstone 32 away from the tire T.

Since grinding may occur at the treads, sidewall, or the shoulder therebetween, the grinding head 30, shroud 40, and motor 35 may be made pivotable about an axis 70. In the embodiment shown, the end 28 of the arm 16 attaches to the shroud 40 of grinding head 30 at a pair of pivot points 72, 74 located on either side of the shroud 40. As shown in FIG. 5, the pivot points 72,74 may be located generally at the base 76 of the motor 35 and in substantial alignment with the top portion 78 of the shroud 40. A tilt adjuster 80 may extend between the arm 16 and the housing of the motor 35, wherein displacement of the tilt adjuster 80 pivots the grinding head 30 about the axis 70 defined by pivot points 72, 74. In this way, the grindstone 32 may be actuated to contact the sidewall, shoulder, or tread in substantially parallel relation to the surfaces if desired. It will be appreciated that depending on the type of irregularity that is to be removed from the tire, the grinding surface 52 of the grindstone 32 may be positioned at various angles.

It will further be appreciated that it may be desirable to obtain different surface characteristics for different tires T or portions thereof. Consequently, differing grinding treatment of tires T may be required as various tires T are tested at the tire uniformity machine. To accommodate the variance in tires T, the speed and direction of rotation of grindstone 32 may be varied either through controlling the speed of the motor 35, or through the use of other known means including pulley or gear differentials. Further, grindstone 32 having a different grit may be selected to obtain a desired surface characteristic.

It will still further be appreciated that the grinding head 30 and motor head 35 may be retrofit to existing grinders with little or no modification.

While a full and complete description of the invention has been set forth in accordance with the dictates of the patent statutes, it should be understood that modifications can be resorted to without departing from the spirit hereof or the scope of the appended claims.

Thus, the invention has been illustrated and described with regard to a grinding head carrying dual grindstones but the linear actuation with respect to the tire and the direct drive of the grindstone would also have application to a grinding having only one grindstone.

What is claimed is:

1. A grinder in a tire uniformity machine that receives a tire for testing, the grinder comprising:

an arm received in bearings;

a grinding head supported on said arm, the grinding head having a rotatable grinding stone and a motor causing the rotation of the grinding stone;

a pair of end members extending generally axially from said arm, wherein said grinding head is pivotally supported between said end members; and a linear actuator operatively engaging said arm to selectively cause axial movement thereof causing said grindstone to selectively contact the tire.

2. The grinder of claim 1 further comprising a tilt adjuster extending between said arm and said grinding head.

3. The grinder of claim 1, wherein said end members are pivotally attached to said arm.

4. The grinder of claim 3 further comprising spacing adjusters extending between said arm and said end members, said spacing adjuster adapted to cause rotation of said end members.

5. A grinder in a tire uniformity machine receiving a tire having a central axis for testing, the grinder comprising:
   a support member:
   linear bearings mounted on the support member;
   an arm carried on the bearing and movable toward or away from the tire;
   a grinding head supported on an end of said arm proximate the tire, the grinding head including a pair of rotatable grinding stones and at least one motor causing rotation of the grindstones, wherein the end of said arm includes a pair of spaced members, wherein said grinding head is rotatably supported between the spaced members, about an axis perpendicular to the central axis of the tire; and
   a linear actuator operatively engaging said arm causing the grindstone to move linearly to contact the tire.

6. A method of removing material from a tire in a tire uniformity machine that rotates a tire for testing, the method comprising:
   providing an arm;
   carrying a rotatable grindstone on an end of said arm:
   supporting said arm in linear bearing;
   driving said arm linearly toward the tire causing said grindstone to contact the tire;
   rotating the grindstone as the grindstone contacts the tire; and
   reversing the direction of the rotation of said grindstone.

7. A grinding head in a grinder for a tire uniformity machine having a frame, the tire uniformity machine receiving a tire for testing within the frame, said grinding head comprising a grindstone rotatably supported in a shroud and directly driven by a motor mounted adjacent said grindstone.

8. The grinding head of claim 7, wherein said motor is reversible.

9. A grinder in a tire uniformity machine receiving a tire having a central axis for testing, the grinder comprising a support member having rolling element bearings mounted thereon;
   an arm carried on said rolling element bearings and movable toward or away from the tire;
   a grinding head supported on an end of said arm, the grinding head including a rotatable grindstone;
   a motor operative to cause rotation of said grindstone; and
   a linear actuator operatively engaging said arm causing said grindstone to move linearly to contact the tire.

10. The grinder of claim 9, wherein said linear bearings include pairs of offset rollers receiving an edge of said arm.

* * * * *